(133.)
J. A. PRESTON.
Improvement in Seed Planter.
No. 122,736.                  Patented Jan. 16, 1872.
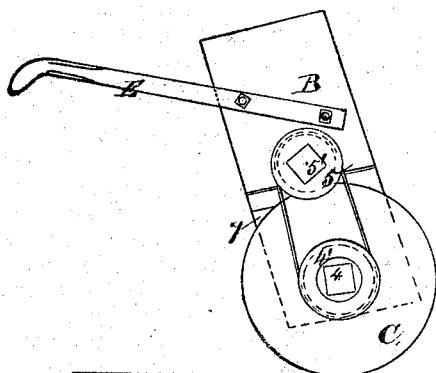
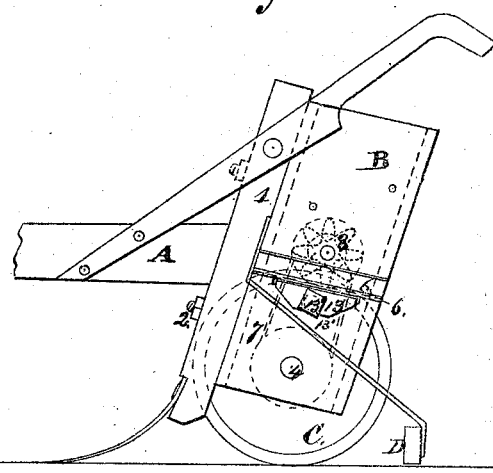
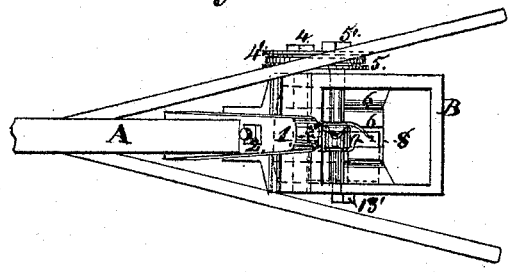
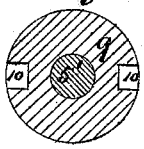
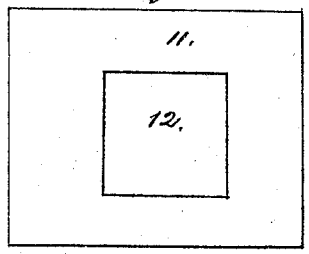
Witnesses:
W. Bradford
W. H. Stebbins
Inventor:
James A. Preston
per John J. Halsted
Attorney 122,736

UNITED STATES PATENT OFFICE.

JAMES A. PRESTON, OF GREENSBOROUGH, GEORGIA.

IMPROVEMENT IN SEED-PLANTERS.

Specification forming part of Letters Patent No. 122,736, dated January 16, 1872.

SPECIFICATION.
*To all whom it may concern:*

Be it known that I, JAMES A. PRESTON, of Greensborough, in the county of Greene and State of Georgia, have invented certain Improvements in Implements for Planting Cotton-Seed, Corn, Peas, &c., and for Distributing Fertilizers; and I do hereby declare that the following, taken in connection with the drawing which accompanies and forms part of this specification, is a description of my invention sufficient to enable those skilled in the art to practice it.

My improvements consist in an apparatus adapted for planting cotton, distributing fertilizers, and dropping corn or peas, the apparatus being made so as to be readily attachable to and detachable from an ordinary plow-stock.

Figure 1 represents the same applied to a plow-stock. Fig. 2 is a top view. Fig. 3 illustrates the invention when detached from a plow-stock and ready for use as a hand implement. Figs. 4 and 5 show a cross-section of a cylinder and a plan of a removable bottom used in planting corn, peas, and the like.

A represents the stock of an ordinary plow; and by my novel adaptation of my other apparatus thereto I save the cost of two complete implements—the hopper B, with its connections, being arranged to be adjustably secured upon the helve or upright 1 of the plow by means of bolts and nuts 2, which pass through such upright and through elongated slots in the hopper. The hopper thus assumes an inclined position corresponding with the inclination of the helve. The lower half of the hopper I make narrower than the upper half, as seen, and through this lower half passes the axle 4 of a wheel, C, which is located at one end of the axle in such position as to permit it to run in the furrow somewhat on one side of the same, while the discharging-mouth of the hopper passes along and distributes the seed, &c., in the middle of the furrow. The ordinary share, or any other substituted for it, may be used to make the furrow. From a pulley, 4′, on the side of wheel C, a belt passes to a pulley, 5, on a shaft which passes through and has its bearing in the hopper at a point somewhat above the floor 6. In this floor, which I prefer to make of thick sheet-iron, and which is located at the top of the chute 7 or narrower part of the hopper, is an opening of proper size and in proper position relatively to the spiked cylinder 8, to permit the proper stirring and distribution from the hopper of the cotton-seed or fertilizer, as the case may be; the cylinder and its shaft being caused to revolve as the plow is pulled forward by means of the belt, which derives its motion from the wheel C, the latter getting its motion by rolling upon the ground. D is a coverer following in the rear of the chute, and which for all seed planting serves to cover such seed; my implement, as a whole, thus serving to complete the work of opening, dropping the seed, and covering the same all at one passing over the row. When distributing fertilizers the coverer may be removed, when found desirable. My improved apparatus is adapted to be used by hand-power as well as by horse-power. To do this I simply unscrew the nuts from the bolts which connect it with the plow, and attach handles E, Fig. 3, to the hopper after the manner of a wheelbarrow, and then push the same along like a barrow, the parts in other respects performing the same duty as before. This detached hand use of the implement is especially desirable and efficient in the distributing of fertilizers; and I find that a boy of fifteen years can with it distribute as fast as two plows can open, doubling each furrow. Hence, for this use of it, I prefer to detach it; but it will also perform the same duty efficiently, when carried by the plow. For dropping corn and peas I make a slight change; substituting for the spiked cylinder 8 a cylinder, 9, in the periphery of which are cavities 10, made of appropriate size to permit a fitting number of peas or kernels of corn to lodge therein. Above this cylinder I then place within the hopper a removable tin floor, 11, fitting it down so that the cylinder may project into the opening 12 in such floor. The sliding gauge 13, by means of which the size of the outlet from the hopper to the chute is graduated, is slidden back to open this passage as far as it will admit, so that the corn or peas may not lodge, but shall pass freely out to the middle of the furrow. The hopper being now filled, the cylinder, in its revolution, carries downward beneath the bottom 11 such grains as lodge in its cavities; and in its further revolution drops the same through the chute. The floor 11 rests on, or nearly upon, the axle of the cylinder.

To drop corn and peas alternately by the same action, I place a vertical partition in the center of the box or hopper, and make the cavities in the cylinder not only on opposite sides but also toward each end of the cylinder, so that one end of it may drop corn and the other end peas. The distance apart of the grain deposited may be regulated by the size of the pulley.

I claim—

The hopper, substantially as described, with its operative mechanism, adapted to be attached to the rear of a plow-standard, or detached therefrom and used as a hand-implement, substantially as and for the purposes set forth.

Witnesses:     JAMES A. PRESTON.
JOHN S. JACKSON,
THOMAS S. HUTCHESON.     (133)